United States Patent
Yang (10) Patent No.: US 9,595,177 B2
(45) Date of Patent: Mar. 14, 2017

(54) NOISE COMPENSATING EAS ANTENNA SYSTEM

(71) Applicant: Xiao Hui Yang, Saratoga, CA (US)

(72) Inventor: Xiao Hui Yang, Saratoga, CA (US)

(73) Assignee: WG Security Products, Inc., Campbell, CA (US)

( * ) Notice: Subject to any disclaimer, the term of this patent is extended or adjusted under 35 U.S.C. 154(b) by 0 days.

(21) Appl. No.: 14/569,786

(22) Filed: Dec. 14, 2014

(65) Prior Publication Data

US 2016/0260304 A1  Sep. 8, 2016

(51) Int. Cl.
G08B 13/14 (2006.01)
G08B 13/24 (2006.01)
G06K 7/10 (2006.01)

(52) U.S. Cl.
CPC ..... *G08B 13/2468* (2013.01); *G06K 7/10336* (2013.01); *G08B 13/2417* (2013.01); *G08B 13/2471* (2013.01); *G08B 13/2474* (2013.01); *G08B 13/2477* (2013.01); *G08B 13/2488* (2013.01)

(58) Field of Classification Search
CPC ............ G08B 13/2474; G08B 13/2471; G08B 13/2477; G08B 13/2488; G08B 13/2462; H01Q 1/2216; H01Q 7/00; G06K 7/0008; G06K 7/10336
USPC ........... 340/572.4, 572.7, 572.1, 10.1, 568.1; 343/742
See application file for complete search history.

(56) References Cited

U.S. PATENT DOCUMENTS

| | | |
|---|---|---|
| 4,799,025 A | 1/1989 | Le Queau |
| 5,049,857 A | 9/1991 | Plonsky et al. |
| 5,300,922 A | 4/1994 | Stoffer |
| 5,353,011 A | 10/1994 | Wheeler et al. |
| 5,428,404 A | 6/1995 | Ingram et al. |
| 5,495,229 A | 2/1996 | Balch et al. |
| 5,572,164 A | 11/1996 | Kasperkovitz et al. |
| 5,602,531 A | 2/1997 | Rude et al. |
| 5,627,516 A | 5/1997 | Balch et al. |
| 5,699,045 A | 12/1997 | Frederick et al. |
| 5,955,950 A * | 9/1999 | Gallagher, III ...... G06K 7/0008 340/572.1 |
| 6,188,310 B1 | 2/2001 | Balch et al. |
| 6,351,216 B1 * | 2/2002 | Frederick ........... G08B 13/2471 340/572.4 |
| 6,700,490 B2 | 3/2004 | Frederick |
| 8,786,439 B2 * | 7/2014 | Yang .................. G08B 13/2477 340/572.1 |

(Continued)

*Primary Examiner* — John A Tweel, Jr.
(74) *Attorney, Agent, or Firm* — Robert R. Waters; Brian W. Foxworthy; Waters Law Group, PLLC (57) ABSTRACT

An EAS system employs multiple antennas which are in separate electrical circuits and do not overlap to avoid magnetic coupling. Each antenna is paired with each other antenna. The controls for the system employ multi-function amplifier filters (MAF) to perform a difference operation on the signals in each pair. The results are converted from analog to digital and directed to a digital signal processor (DSP). The DSP adjusts digital potentiometers to minimize the differences at the MAFs. The controls then operate at least one antenna to pulse generate an interrogation field. The controls monitor the antenna signals for additional signal at the MAFs. The DSP performs pattern recognition on additional signals at the MAFs to distinguish types of EAS tags.

22 Claims, 7 Drawing Sheets

(56) References Cited

U.S. PATENT DOCUMENTS 8,854,188 B2* 10/2014 Stewart ............... G06K 7/0008
340/10.1
2013/0278426 A1 10/2013 Sayegh et al.

* cited by examiner

NOISE COMPENSATING EAS ANTENNA SYSTEM

FIELD OF THE INVENTION

This invention relates generally to electronic article surveillance. More specifically, this invention relates to an antenna system that compensates for noise in the environment of the electronic article surveillance system.

DESCRIPTION OF RELATED ART

U.S. Pat. No. 5,495,229 by Balch et al. is for "Pulsed electronic article surveillance device employing expert system techniques for dynamic optimization". An electronic article surveillance system has a receiver with a plurality of receiving coils. Each coil in the system is treated as a separate detection unit with its own noise environment, which is distinct from the noise environments of the other coils in the system. This allows the system to optimize its performance by maximizing the sensitivity of each coil according to its own local noise environment. In EAS systems in accordance with the invention, the priority of the detection routines is to keep an accurate and up-to-date picture of the noise environment for each coil in "noise phases" and to look for tags during "transmit phases". Upon tag detection, a controller establishes a validation sequence comprising a number of cycles and can change the number of cycles adaptively to the noise environment.

U.S. Pat. No. 5,699,045 by Frederick et al. is for "Electronic article surveillance system with cancellation of interference signals". An electronic article surveillance system includes a signal generator for generating an interrogation signal in an interrogation zone, an antenna which receives a signal present in the interrogation zone, and interference cancelling circuitry for cancelling interference components in the signal received by the antenna. The interference cancelling circuitry includes a hybrid interference component cancelling loop in which a digital interference estimate signal is formed and converted into an analog estimate signal, and the analog estimate signal is subtracted from an input analog signal. The resulting difference signal is processed with a hybrid automatic gain control loop. A digitized signal, formed from the resulting difference signal, is subjected to digital interference cancellation processes in addition to the hybrid interference component cancellation process. Each of the digital interference cancellation processing and the hybrid interference component cancellation loop entails performing a respective polyphase decomposition of a digital input signal, estimating a mean value of each of the resulting subsequences, and combining the estimated mean values to form an interference component estimate signal. An input sample window provided for a comb-filtering stage is adjusted in phase relative to the cycle of the interrogation signal to compensate for changes in phase of the marker signal to be detected.

U.S. Pat. No. 6,351,216 by Frederick et al. is for "Large signal noise cancellation in electronic article surveillance". In an EAS system and method, a reference antenna is used to spatially separate the interference and tag signal allowing the interference signal to be removed, which improves performance of the EAS receiver. The reference antenna is coupled to the system by an adaptive filter, which can be a software filter that is continually adapting itself to optimum performance. The continuous adaptation obviates the need for manually tuning the coupling network and permits the system to perform at its optimum level over long periods of time.

U.S. Pat. No. 6,700,490 by Frederick is for "Digital detection filters for electronic article surveillance". Digital implementation of electronic article surveillance (EAS) detection filtering for pulsed EAS systems is provided. Embodiments include direct implementation as a quadrature matched filter bank, as an envelope detector, a correlation receiver, and as a discrete Fourier transform. Pre-detection nonlinear filtering is also provided for impulsive noise environments.

BACKGROUND OF THE INVENTION

A common logistical concern in businesses is the tracking of assets or persons. In retail, one example of this logistical tracking concern is shoplifting. Many retail establishments employ electronic tags attached to goods that can be detected by systems installed for that purpose. A common term for these systems, tags, etc. is electronic article surveillance, or EAS.

Many of these tags and systems are only capable of registering the presence of the tag. Transmitters and receivers are located at exit points within a retail environment and the transmitter creates an interrogation zone at the exits while the receivers scan for responses from tags passing through the interrogation zone. The transmitters and receivers are typically housed in pedestals. There are several types of tags for these systems, one of which is a harmonic tag and another of which is a resonance tag. With the harmonic tag the electromagnetic interrogation field creates stored energy in the harmonic tag, and when the interrogation field is turned off this energy dissipates from the tag and produces a signal which is a harmonic of the interrogation field. With the resonant tags, the resonant tags vibrate with the interrogation field and produce a signal from this harmonic resonation. The system is tuned to the expected frequencies whether they are harmonic tags or resonant tags, and the receiver antennas of the system detect these signals. A common frequency for these systems is 58 kHz. When a signal is detected within an interrogation field, it is assumed that a tag is present and that it is improperly being removed from the retail facility. Similar systems may also be used to identify authorized personnel.

Generally, premises using electronic article surveillance systems have other electrical systems within them. These electrical systems will themselves put out electromagnetic waves, which are noise in the areas being monitored by the electronic article surveillance systems. More recently, developments in electronics in these premises have increased the level of noise in the specific frequency range in which the EAS systems typically operate. In an effort to achieve energy savings, many locations have changed to DC powered systems requiring DC to DC power supplies, resulting in the increased noise level in the pertinent frequency range. This increased level of noise in the operating frequency for the EAS systems makes it much more difficult to detect EAS tags in interrogation zones, since the strength of the signals from EAS tags is relatively weak. The present invention addresses this problem of high noise environments in EAS systems.

Another problem commonly encountered in electronic article surveillance systems is alarms generated by EAS tags not in the interrogation zone but near the pedestals housing the transmitters and receivers. The terminology employed with respect to this problem is "front field" and "back field".

The front field is in the interrogation zone, while the back field is generally on the opposite side of the antennas from the interrogation zone. The front of retail stores is frequently used as display areas for merchandise. Since exits are typically also located at the front of stores, this puts merchandise in close proximity to the EAS pedestals and enclosed antennas. It is preferred that the merchandise retain the EAS tags while on display, but the close proximity of tagged merchandise in the back field of the antennas can lead to false alarms. At least one embodiment of the present invention addresses this problem of alarms generated by EAS tags in the back field.

Many prior art EAS antenna systems have attempted to compensate for the presence of ambient noise in the retail environment. For an EAS monitoring system, the problem is compounded by the fact that the amplitude of the total noise from all sources, or the "composite noise envelope" may be greater than that of a single EAS tag that enters the interrogation zone. Moreover, noise sources are constantly changing in a dynamic environment in often unpredictable ways. Many of the prior art systems, including those discussed above, have relied upon digital filtering of noise using DSP to differentiate or "filter" noise from the EAS received signal. However, DSP-based filtering is not optimum because of the time delay associated with such systems. In addition, such systems are often limited in their effectiveness if they do not effectively model the composite noise environment prior to analyzing incremental changes that may (or may not) suggest the presence of a tag signal.

SUMMARY OF THE INVENTION

The present invention may be practiced in several embodiments employing starkly different configurations of antennas. One group of embodiments employs traditional EAS pedestals to house the antennas. Another group of embodiments locates the antennas within the floor of the monitored area. In the embodiments employing pedestals, the pedestals are typically vertically oriented and each pedestal houses a set of antennas. The pedestals generate an interrogation field that spans the entry or exit of a monitored area. In embodiments locating the antennas in the floor, the antennas themselves span the entry or exit of the monitored area, as does the interrogation field generated by the antennas. Embodiments mounting the antennas in the floors are far less obtrusive than those using pedestals, and allow much greater flexibility in the use of the space at entry and exit points and are generally preferred for esthetic reasons.

Pedestal Embodiments

Pedestal embodiments of the present invention begin with pedestals housing separate antennas to generate interrogation zones at the exits of monitored areas and to detect signals from tags within the interrogation zone. These pedestals employ a plurality of dual-purpose antennas that function as both a transmitting antenna and a receiving antenna alternately. In the current invention, at least three (3) such antennas being considered preferred. However, an electronic article surveillance system within the scope of this invention could operate with two antennas or more than three antennas. Also, a single pedestal or more than one pedestal can be used. As well, some antennas may be single purpose antennas. Each of the antennas is electrically separate and does not physically overlap any other antenna such that they are separate and distinct electromagnetically.

The separate and distinct nature of the antennas means that it is very unlikely that a noise source (or a tag) will be equal distance from each antenna. However, this condition requires that when only three antennas are employed, the antennas must be coplanar and their centers must be collinear. Because a tag within the interrogation zone is relatively close to the pedestals, the difference in distances between a tag and the several antennas is significant as a percentage of the distances themselves. The different distances between a tag and the individual antennas, facilitates detecting and analyzing signals from the tag.

While a tag in the interrogation zone will be relatively close to the pedestals and antennas, the sources of interference, or noise, in the premises being controlled by the EAS system will be relatively far from the pedestals. This means that the difference in distances between a source of noise and each antenna will be much smaller as a percentage of the distance. Because of this, the noise source will register very nearly the same with each antenna. However, if the noise source is large, the "delta" or difference between the measured values at the different antennas of such noise sources may still exceed that of a tag source.

When two pedestals are employed, the ability to differentiate the distance between a tag and a pedestal can be applied to the back field problem. When the tag is outside of the interrogation field and in the back field, it will be much closer to one of the pedestals than the other. The different antennas in the closer pedestal will pick up signals from tag with distinct differences. However, the pedestal that is farther away will receive signals at each antenna that vary by a much smaller percent, similar to noise sources as discussed above. Comparing the signals received from the tag by each pedestal will make it clear that the tag is in the back field and not in the interrogation zone, or front field. One embodiment of the invention uses the same controller to operate both pedestals to more easily compare the signals detected by each pedestal.

At least one transmitting antenna is required to generate the interrogation field. This transmitting antenna may be a dedicated transmitter antenna, or it may function as both a transmitting antenna and receiving antenna, i.e. function as a transceiver antenna. Additional transmitting antennas may be used and these also may be transmitter antennas only or may be transceiver antennas.

In-floor Embodiments

In-floor embodiments of the system locate the antennas in the floor. The antennas are located between the subfloor and the floor covering, such as floor tiles. Antennas of the in-floor embodiments may be substantially larger than the antennas of the pedestal embodiments. The in-floor antennas may, for example, be five feet by three feet, so that a set of four such antennas would span an area twenty feet in length. As with the pedestal embodiments, these antennas do not overlap so that electro-magnetic coupling is nearly a nullity, especially when these antennas are receiving signals. The detection range for the in-floor antennas may reach up above the floor to a height of around five feet or more.

Some in-floor systems will employ a larger antenna that fully circumscribes the others. In those embodiments, this larger antenna generates the interrogation field, while the relatively smaller antennas sample the noise environment and monitor for tag signals. In these embodiments, since the interior antennas are passive, electro-magnetic coupling between the interior antennas is a non-factor.

Because of their location, the antennas of in-floor embodiments, essentially do not have a "back-field", but rather, only a "front field". This means a partial loss of functionality for in-floor embodiments versus pedestal embodiments, in that a comparison cannot be performed between signals received at two separate and distinct sets of antennas. In pedestal embodiments this comparison of signals is used to judge where a tag is located; whether a tag is between pedestals or outside of pedestals. However, the large area covered by the antennas of in-floor embodiments provides an alternative source of sensitivity. If a tag is located at one extreme end of the antenna foot print, it will have a far stronger signal profile to the antenna at that end than the antenna at the opposite end. Since the antennas are electrically separate and electro-magnetic coupling is minimal, a comparison of signals at the different antennas will yield information about the location of the tag.

Creating a Group Noise Environment Balance Point (BP)

Before the EAS system generates the interrogation field, the receiving antennas sample the signals on the premises. Since an interrogation field has not been generated at that point in time, the EAS system interprets any signals received in the environment as noise, rather than a tag passing through the interrogation zone. During this step, which could be called a "preconditioning step", the noise signals received by each antenna will be compared to the noise signals received by the other antennas to effectively model the composite noise signal. Because the environment noise sources are relatively far away from the system, the percent of difference in noise amplitude detected between a given pair of antennas is very small. The differences in noise that are detected at the antennas are adjusted and reduced between each possible pair of antennas, i.e. within the system, each antenna is paired with each of the other antennas and the difference between the signals of the antennas in each pair is reduced. Also, just as a difference in distance can effect the strength of a signal detected at different antennas, the difference in distance of a signal from antennas can result in a phase difference for the same signal at different antennas. The signals received by each antenna are passed through a noise filtering system such as a quadrature filter.

Initially, a band pass filter reduces the signal from an antenna down to the frequency in which the system and tags operate. A typical EAS frequency is 58 kHz. Then each signal in the pair passes through a phase shifting circuit to bring the two signals more into phase with each other. With the signals narrowed to the appropriate band and brought more nearly in phase with each other, the system performs a differencing operation between the noise signal amplitude of each antenna. The signal result of the difference operation is converted from analog to digital and input into the digital signal processor. The digital signal processor then adjusts the noise signal amplitude of one or both antennas in a pair with feedback loops to digital potentiometers associated with each antenna for a pair until the amplitude ratio within antenna pairs after filtering is optimized as close to 1:1 as possible, i.e. the difference in amplitude between the antenna pairs is at a minimum. At this point the Group Noise Environment Balance Point (BP) has been achieved. The number of pairs to be differenced depends on the number of antennas in the system. For example, with two antennas only one pair is differenced. For three antennas there are three pair combinations to be differenced (1-2, 1-3, 2-3), for four antennas there are six pair combinations to be differenced (1-2, 1-3, 1-4, 2-3, 2-4, 3-4), and so on as more antennas are introduced. The number of possible pairs among n items is the summation of integers from 1 through n−1.

In fully automated embodiments of the system, environment noise signal amplitude adjustment is only made just before each transmission to arrive at the BP. There is no further adjustment done at any other time until just before the next transmit time. One complete cycle involves establishing a BP, transmitting an interrogation zone, and searching for a tag signal, and then the cycle repeats. This cycle is repeated whether or not a tag is detected.

The signal processing principles of the system are based on distance and amplitude such that it does not create time delays or estimation errors that can be introduced by the DSP. The result is a reliable system that compensates for environment noise and detects tags in real time.

Once the BP has been achieved, the system will begin transmitting to generate an interrogation zone. Because the BP has already been achieved within the system, the system assumes there is no new noise source and so incoming noise is no longer considered until after transmission and search for a tag signal is completed.

If no tag enters the interrogation zone, the system will again generate a new BP, transmit, and search for a tag signal. This will be a repetitive operation with a new BP generated each cycle.

Tag Detection

When a tag enters the interrogation zone, the tag signal will be seen as a delta increase to the previously established BP. Because the tag is closer to the system, the percent of difference in distance from the tag to each of two antennas is significantly greater than what is measured from those same antennas to the environment noise source. The tag amplitude detection difference within an antenna pair will therefore be sufficiently different. Because the BP is held stable, there will be a difference seen between two antennas, which is the tag signal clearly visible as a delta to the BP level. The system can now perform additional testing of the delta signal to determine whether it is a tag or not. In some embodiments, the digital signal processor applies pattern recognition techniques to the delta to determine if an EAS tag is the source of the delta. EAS tags have known signal patterns with initial peaks and decay rates.

Dual Antenna System

With a 2-antenna system, the tag can technically reach a point that is equidistant from the antenna pair. In such a case, the delta between the signal amplitude seen by the antenna pair is sufficiently insignificant as to be viewed as environment noise by the system and become part of the BP. However, this would be quite unlikely since as the tag approaches the system it is almost impossible to approach in a straight line to maintain equidistance between the tag and each antenna. Furthermore, should the tag finally rest within the interrogation zone, any slight movement would immediately create an unbalanced distance and a new tag delta signal would be generated.

Adding More Antennas

Although a single antenna pair is sufficient for an operational system, adding a third antenna guarantees that the tag will not be equidistant from at least one antenna pair and therefore eliminate any chance that the tag signal will be viewed as environment noise.

When there are more than two antennas in the system, the same process as previously described is applied to every combination of antenna pairs until a BP has been achieved for the group of antennas. For example, in the case of 3 antennas, the system will perform differencing between antennas 1 & 2, 1 & 3, and 2 & 3 until the noise signal amplitude of all antenna pair combinations have been adjusted to optimal minimum values, the BP. At this point the system will begin to transmit and generate an interrogation zone.

If no tag enters the interrogation zone, the system will again generate a new BP, transmit, and search for a tag signal. This will be a repetitive operation with a new BP generated each cycle.

When a tag enters the interrogation zone, the tag signal will be seen as a delta increase to the previously established BP. Because the tag is closer to the system, the percent of difference in distance from the tag to each of two antennas is significantly greater than what is measured from those same antennas to the environment noise source. The tag amplitude detection difference between the antenna pair will therefore be sufficiently different. Because the BP is held stable, there will be a difference seen between two antennas, which is the tag signal clearly visible as a delta to the BP level. The system can now perform additional testing of the delta signal to determine whether it is a tag or not.

There is no constraint to the number of antennas that can be used to implement this design. As more antennas are added, there are more antenna pairs from which environment noise is processed to achieve a Noise Environment Balance Point from which the tag delta noise signal is detected and processed.

Whatever the particular configuration of antennas, having automatically tuned the quadrature filters to reduce the difference in output of the background noise from the antennas to an acceptable level, the system next generates an interrogation field as per prior art methods. Consistent with the typical operation of an EAS system, any tag in the interrogation field will be energized by the interrogation field and produce a signature signal. The EAS system next stops broadcasting the interrogation field to listen for the presence of a tag. With the tuned quadrature filters, the background noise is reduced and contributes the same amount at each antenna. However, because a tag in the interrogation zone is closer to the receiving antennas, it will not be functionally equidistant to all of the antennas and its contribution to the signals received at two or more antenna will differ. Additionally, since the filters in the system have been tuned to reduce the output level of the ambient noise, the signal from tags will appear to be greater in proportion to the filtered noise.

Prior art EAS systems have utilized transceiver antenna configurations that alternate between transmitting an excitation signal to be picked up by any EAS tags within the zone, and then "listen" or receive a response signal from the newly excited tag within the zone. The system set forth in the current invention adds another step to the process, that being the pre-transmission noise modeling step. Thus, procedurally, the system's first step is to receive signals from the ambient environment to model the composite noise and adjust the composite noise envelope with digital potentiometers. Next, with the noise modeling completed, the system performs the standard transmission and receiving steps used in prior art systems. The three-step process is then continually repeated.

Embodiments of the present invention utilize pattern recognition techniques to recognize the signal from EAS tags. For example, one type of EAS tag will have larger magnitude signal which attenuates relatively quickly within a second order envelope while another type of EAS tag signal will have a smaller initial magnitude but decay within a second order envelope more slowly. The pattern recognition circuitry will be able to recognize the decay envelopes of the tags and thereby detect that a tag is indeed present within the interrogation field. Once an EAS tag is detected, typical EAS alarm protocols are triggered.

DETAILED DESCRIPTIONS OF THE EMBODIMENTS

The detailed description below of certain embodiments is intended to explain the current invention. It is to be understood that a variety of other arrangements are also possible without departing from the spirit and scope of the invention. While some of the detailed description relates to an automatically self-tuning system, there is nothing that would prevent manual tuning in an environment where the noise profile is sufficiently stable. This manual capability could be inherent to the system, or an external device could be used. A separate tool such as a pendant or laptop could connect to the system or some systems may accommodate wireless communication from a remote device.

Figure 1:
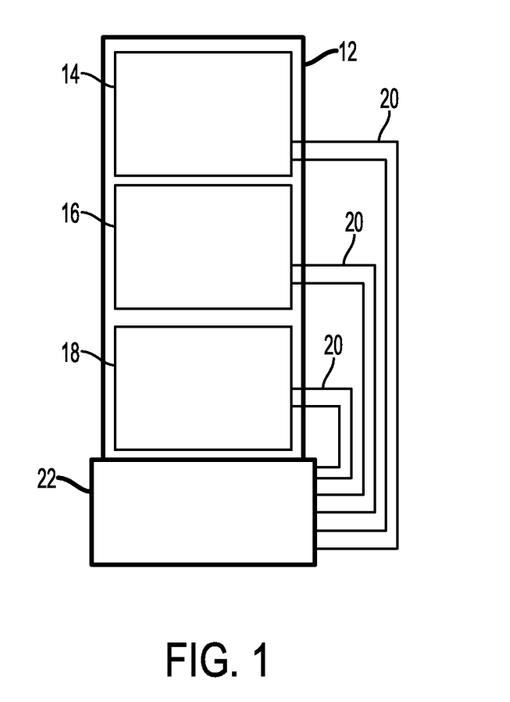
FIG. 1 shows three individual antennas deployed in a single pedestal in an embodiment of the present invention. The top portion of the pedestal is shown in section view.

FIG. 1 shows three individual antennas deployed in a single pedestal 12 in an embodiment of the present invention. The top portion of the pedestal is shown in section view. In the arrangement shown in FIG. 1, first antenna 14 is located at the top, second antenna 16 is located in the middle, and third antenna 18 is located at the bottom. In this embodiment, antennas 14, 16, and 18 are positioned in the same plane and with their centers co-linear. However, as embodiments of the present electronic article surveillance system will condition the signals from the antennas regardless of their particular relative positioning, the arrangement in FIG. 1 is only for simplicity of illustration and is not required.

The antennas are electrically separate and separate sets of wires 20 run from the antennas to the base 22 of the pedestals where controls are located. Also, the antennas do not overlap physically. Because the antennas are electrically separate and positioned separate without overlap, magnetic coupling is minimized and the signals picked up by the antennas can be compared electronically for analysis. Even when only two antennas are used in a particular embodiment, it is extremely unlikely that an EAS tag would be equidistant from both antennas, and especially so if a tag is moving through an interrogation zone. The distance of the tag can be determined electronically and used in the analysis performed by the system.

Figure 2:
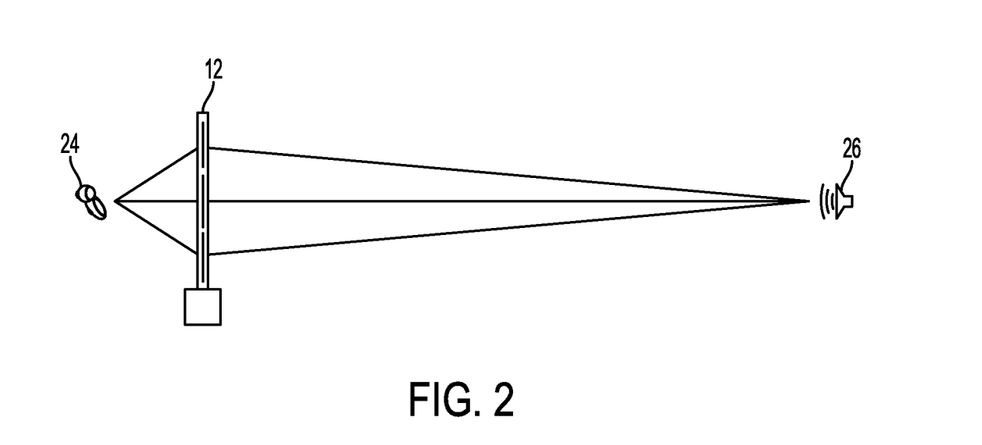
FIG. 2 shows the pedestal of FIG. 1 from the side with an EAS tag to the left and a noise source to its right.

FIG. 2 shows antenna pedestal 12 of FIG. 1 from the side with an EAS tag 24 to the left and a noise source 26 to its right. Generally, EAS tag 24 will be relatively close to pedestal 20 when passing through an interrogation zone, while noise sources such as noise source 26 will be relatively far away. The closer proximity of EAS tag 24 means that its distance from antennas 14, 16, and 18 will vary by a significant percent among the antennas. The farther distance of noise source 26 means that its distance from the antennas 14, 16, and 18 will vary by a small percent among the antennas.

For example, if two pedestals are placed 80 inches apart, the farthest a tag 24 will be from the nearest pedestal 12 is 40 inches. If the distance from the center of the first antenna 14 in a particular pedestal to a third antenna 18 is 60 inches, then the distance between centers is 30 inches. If a tag 24 is horizontally aligned with second antenna 16 as shown in FIG. 2, its distance from second antenna 16 will be 40 inches, and its distance from first antenna 14 and third antenna 18 will be $(40^2+30^2)^{1/2}$ or 50 inches. This is a variance of 20% of the larger distance. However, if noise source 26 is 80 inches from a pedestal, i.e. the distance between the pedestals, and aligned with second antenna 16, its distance from second antenna 16 is 80 inches. Its distance from first antenna 14 and third antenna 18 is $(80^2+30^2)^{1/2}$ or 85 inches. This is a variance of 6% of the larger distance, significantly less than the variance at 40 inches. This smaller variance in distance leads to noise source 26 appearing to be equidistant from the antennas, 14, 16, and 18. As the distance of noise source 26 increases, this is even more so. Additionally, the energy of the field, or signal, at a given point in space is inversely proportional to the square of the distance between the field, or signal source, and the given point. This further amplifies the effect of varying distance at closer ranges.

Figure 3:
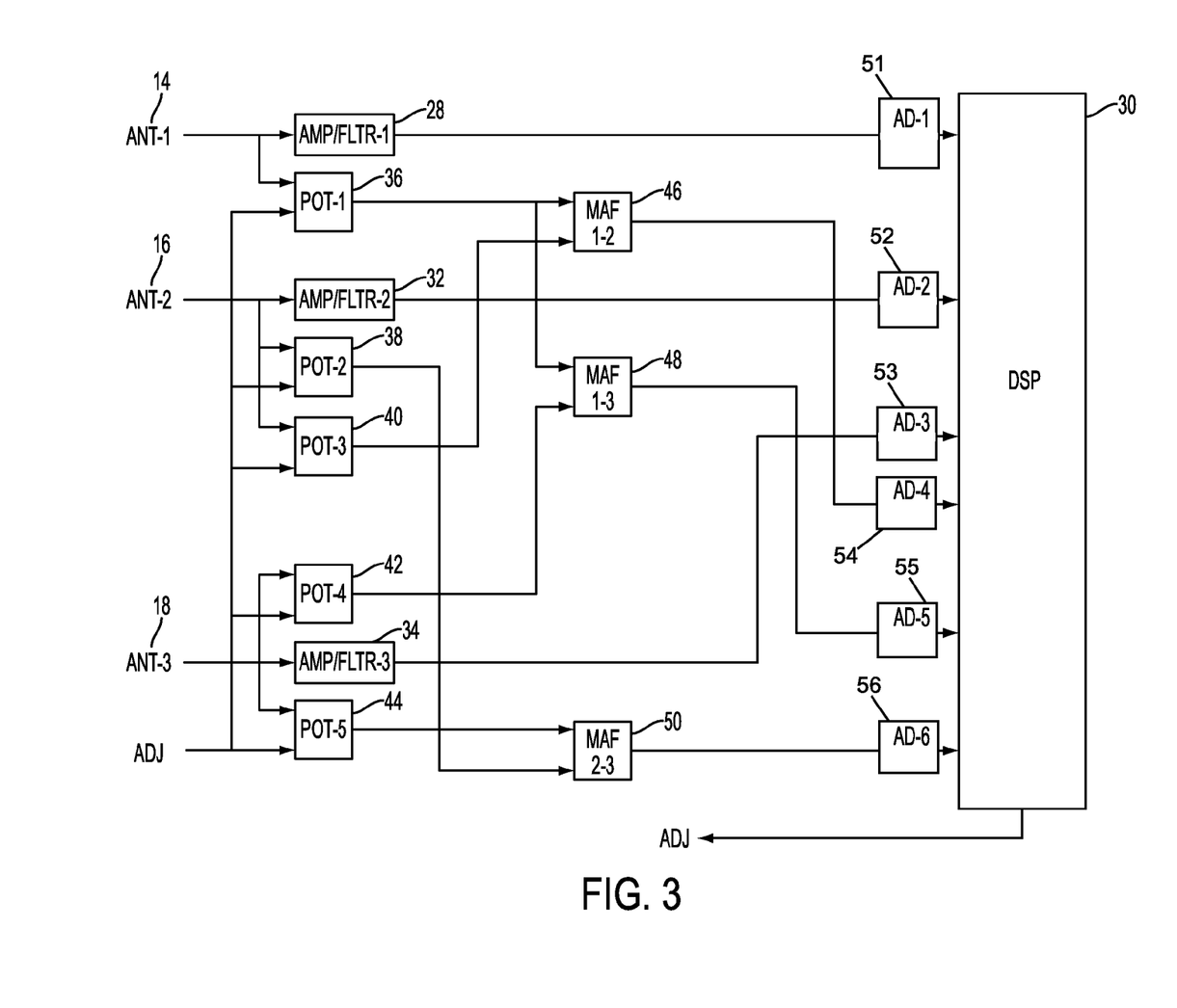
FIG. 3 is a block diagram of the processes applied to the signals received at each antenna.

FIG. 3 is a block diagram of the processes applied to the signals received at antennas 14, 16, and 18. Before an interrogation field is generated, each antenna is operated in a receive mode to detect any signals or fields (i.e., noise sources) that will have an effect on the electronic article surveillance system. These signals, or combination of signals, have strength characteristics as well as frequency characteristics. The strengths of the signals convey power to the antennas which is reflected in the signals the antennas' output. The power received by the antennas is analyzed and their outputs balanced on the basis of the power received by each antenna as reflected in signal strength.

The signal from first antenna 14 is passed through a first amplifier-filter circuit 28 (first AF 28), converted from analog to digital by a first analog-to-digital converter 51, and fed into digital signal processor 30 (DSP 30). The signal from second antenna 16 is passed through a second amplifier-filter circuit 32 (second AF 32), converted from analog to digital by a second analog-to-digital converter 52, and fed into DSP 30. The signal from third antenna 18 is passed through a third amplifier-filter circuit 34 (third AF 34), converted from analog to digital by a third analog-to-digital converter 53, and fed into DSP 30.

Additionally, the signal from each antenna is passed through at least one digital potentiometer and conditioned and compared to each of the other signals within multi-function amplifier filters, each pair of antennas having a dedicated multi-function amplifier filter (MAF) for the process of comparing signals. The comparison results in a difference signal which is converted from analog to digital and passed on to DSP 30. The signal from first antenna 14 is passed through a first digital potentiometer 36 and fed into first multi-function amplifier filter 46 (first MAF 46). The signal from second antenna 16 is passed through third digital potentiometer 40 and fed into first MAF 46 as well. Depending on the embodiment, first MAF 46 performs several operations on the signals it receives.

Figure 4:
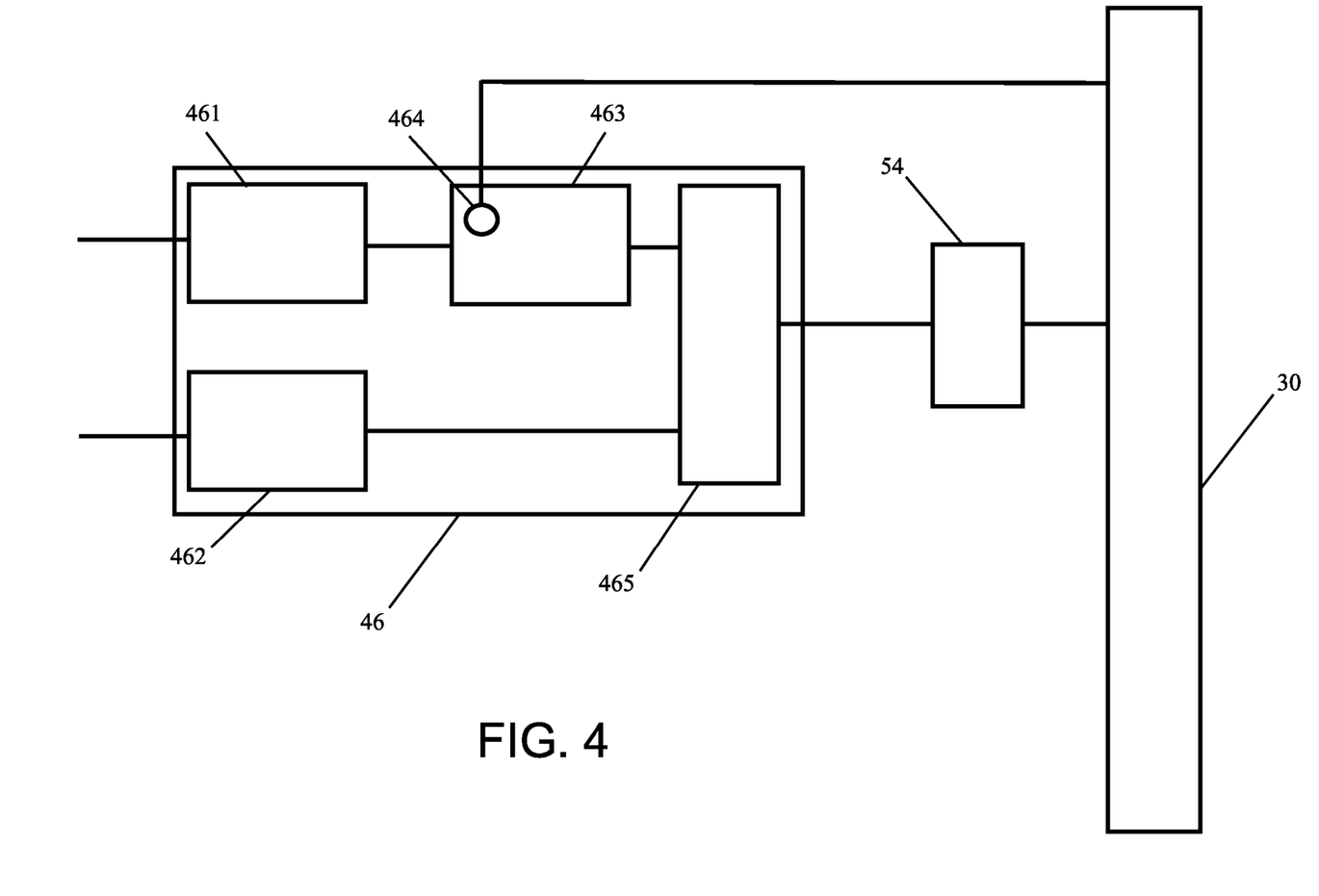
FIG. 4 is a block diagram of an embodiment of a multi-function amplifier filter.

FIG. 4 is a block diagram of an embodiment of first multi-function amplifier filter (MAF) 46. In this embodiment, first MAF 46 comprises a band pass filter for each signal received, band pass filter 461 and band pass filter 462, which reduce the signals down to a frequency band at which the EAS system operates. A common EAS frequency is 58 kHz. Because a source of noise is frequently closer to one antenna than another, the signals induced in different antennas by the same noise source may vary in their phases with respect to each other. To address the phase differences of the received signals, first MAF 46 comprises a tunable phase shifter 463 for one of the signals. Phase shifter 463 of first MAF 46 comprises digital potentiometer 464. Digital signal processor 30 adjusts digital potentiometer 464 to shift the phase of one of the signals bring the two received signals more closely into phase with each other. Having been reduced to an appropriate frequency band and brought more nearly in phase with each other, the signals can be meaningfully compared. The signals are fed into difference operator 465 of first MAF 46. Difference operator 465 performs a signal difference operation on the two conditioned incoming signals. The resulting output from first MAF 46 is directed to digital-to-analog converter 54 which converts the signal from analog to digital and feeds the result on to DSP 30.

The signal of first antenna 14 from first digital potentiometer 36 is also fed into second multi-function amplifier filter 48 (second MAF 48). The signal from third antenna 18 is passed through fourth digital potentiometer 42 and fed into second MAF 48. If the embodiment of second MAF 48 has the same capabilities of the embodiment of first MAF 46 discussed with respect to FIG. 4, second MAF 48 performs a band pass filter operation, phase shift operation, a signal difference operation on the two incoming signals and feeds the result on to fifth analog-to-digital converter 55 and DSP 30. The signal from second antenna 16 is passed through second digital potentiometer 38 and fed into third multi-function amplifier filter 50 (third MAF 50). The signal from third antenna 18 is passed through fifth digital potentiometer 44 and fed into third MAF 50. If the embodiment of third MAF 50 has the same capabilities of the embodiment of first MAF 46 discussed with respect to FIG. 4, third MAF 50 performs a band pass filter operation, phase shift operation, and a signal difference operation on the two incoming signals and feeds the result on to sixth analog-to-digital converter 56 and DSP 30.

Based on the signals input into it, DSP 30 sends adjusting signals to the five digital potentiometers, 36, 38, 40, 42, and 44 to adjust for the differences between the noise signals received by antennas 14, 16, and 18 from the environment when no interrogation field has been broadcast, and to establish a normalized baseline output. These adjustments may be communicated over separate lines or a single line may be used by communicating during windows with switching between the several digital potentiometers 36, 38, 40, 42, and 44. Since each antenna signal is directed to DSP 30 after passing through a respective amplifier-filter, DSP 30 can determine the relative values of those signals to assist in determining the adjustments required at the respective potentiometers. DSP 30 also adjusts the relative tunable phase shifters to bring pairs of signals more closely in phase.

Once the output from the potentiometers due to noise have been used to adjust the readings from the various antennas to be the same threshold setting, the system can begin to operate in tag detection mode and generate an interrogation field from the pedestals. One or all of antennas 14, 16, and 18 may be used to generate the interrogation field, thereby functioning as transceiver antennas. Alternatively, a dedicated transmitter antenna could be employed.

The interrogation field is turned off and antennas 14, 16, and 18 "listen" for signals. Antennas 14, 16, and 18 will still receive noise signals, but if a tag is present, its proximity to the antennas will cause it to register noticeably differently at two or more antennas, as opposed to the baseline threshold noise value. The tag, having been energized by the interrogation field, will dissipate its energy after the interrogation field is removed, and this will generate a signal at antennas 14, 16, and 18 on top of the noise profile already normalized by the system.

In dynamic noise environments, the above measurements, comparisons, and adjustments are made automatically by the system before each cycle of the interrogation field. The system then monitors for the presence of tags after the interrogation field is deactivated. In more stable noise environments, a manually adjusted system could be used. An operator interface would display the difference between antenna signals, and an operator would use the operator interface to manually adjust the digital potentiometers to reduce the difference down to approach the desired 1:1 ratio. For embodiments addressing out of phase signals with tunable phase shifters, the tunable phase shifters can also be manually tuned with an operator interface. This operator interface could be a normal part of the system, or it could be a remote device that connects to the system or communicates with the system wirelessly. The difference between signals could be shown by a set of LEDs or other commonly used visual indicators. Operator interfaces having screens and graphical user interfaces can use a wide variety of graphics to show the differences exiting the multi-function amplifier filters.

Some locations may have relatively stable electronic noise environments, but present multiple profiles. That is to say, a location may present one noise profile over an extended period and then shift to another noise profile for a period. This may occur when equipment is run periodically which would add another component to the noise profile. To assist in operating in such locations, systems using manual adjustments could store the various setting profiles so that they could be easily retrieved and reset, or automatically reset from stored memory.

The two types of tags commonly used in EAS systems, an EAS hard tag and an EAS label tag, will have similar but distinguishable signal characteristics. Both types of tags will generate a signal that fits within a $2^{nd}$ order decay envelope, but the particular characteristics of the envelopes will be distinguishable. In at least one embodiment, the DSP 30 of the system will analyze the signal and apply pattern recognition to the signal to determine if an EAS tag is present.

Figure 5:
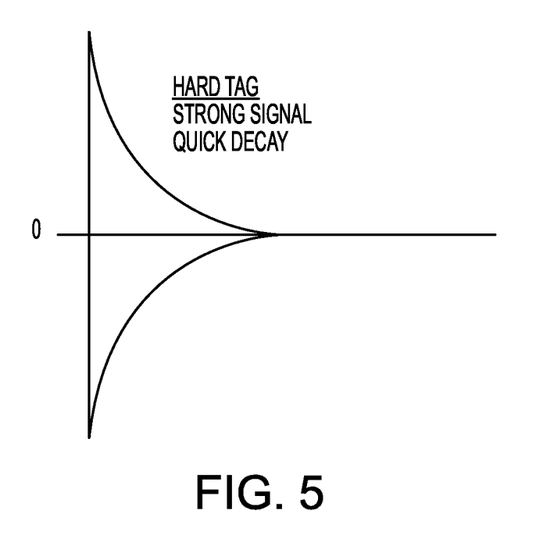
FIG. 5 shows the decay envelope of an EAS hard tag.
Figure 6:
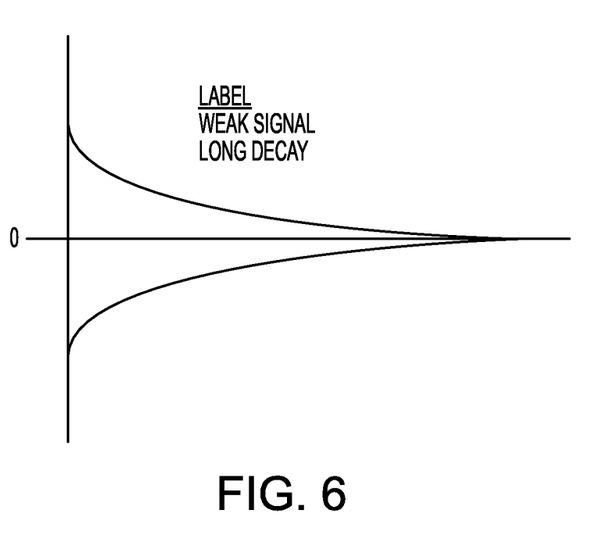
FIG. 6 shows the decay envelope of an EAS label tag.

FIG. 5 shows the decay envelope of an EAS hard tag. The EAS hard tag will have a stronger signal but a quicker decay within a $2^{nd}$ order envelope. FIG. 6 shows the decay envelope of an EAS label. The EAS label tag will have a weaker signal with a longer decay within a $2^{nd}$ order envelope. The DSP is capable of recognizing the presence of the EAS tag signal on top of the noise profile by applying pattern recognition techniques and determining if an additional signal component is present that fits one of the tag signal profiles.

Figure 7:
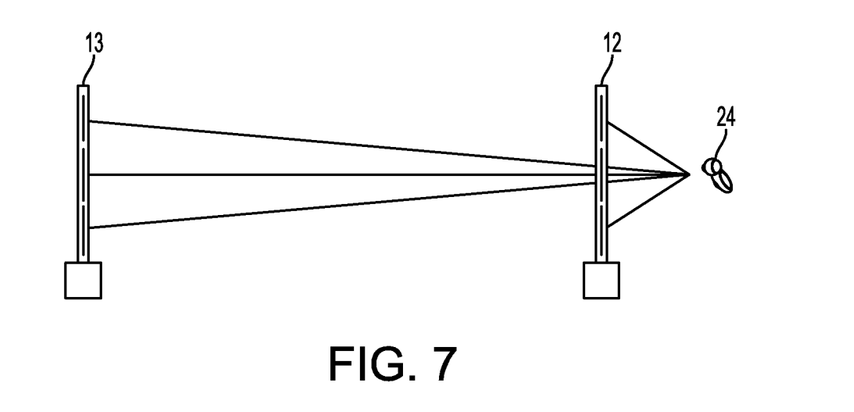
FIG. 7 shows a tag in the backfield of a pedestal and the relative distances to each pedestal.

FIG. 7 shows a tag in the backfield of a pedestal and the relative distances to each pedestal. As may be seen in FIG. 7, a tag in the backfield of a set of pedestals will be closer to one pedestal than the other. A controller operating both pedestals in common can compare the signals detected by each pedestal and determine whether a tag is in between the pedestals or in the backfield. For the nearest pedestal, there will be distinct differences in how two or more antennas receive the tag signal. For the farther pedestal, the distance between the tag and the pedestal will cause the differences between the signals received by each antenna to diminish below a threshold percent. DSP 30 will interpret a differentiable signal at one pedestal and an indistinguishable signal at the other pedestal as a tag in the back field and not a tag in the interrogation zone between the pedestals.

Figure 8:
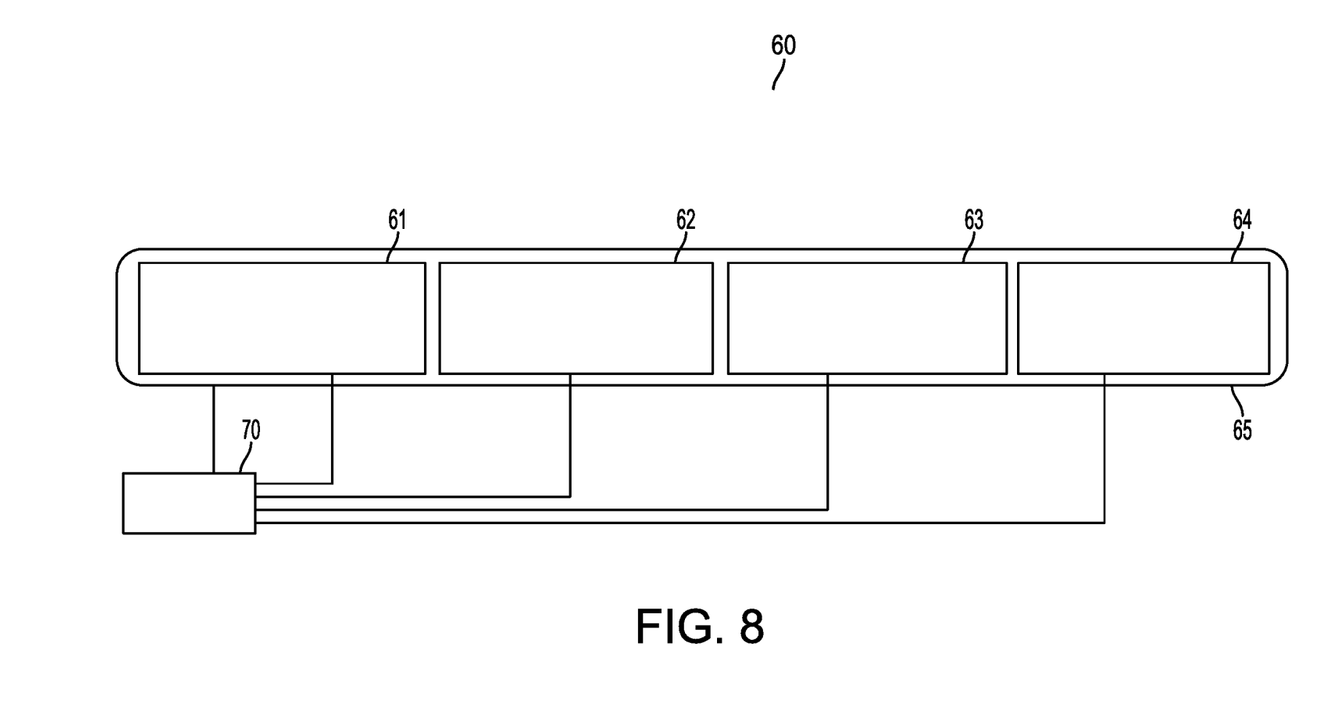
FIG. 8 is a plan view of an embodiment of the noise cancelling antenna system mounted in a floor.

FIG. 8 is a plan view of an in-floor embodiment 60 of the noise cancelling antenna system mounted in a floor. Interior antennas 61, 62, 63, and 64 are arranged in a line without any overlap between them, and all of interior antennas 61, 62, 63, and 64 are surrounded by exterior antenna 65. Interior antennas 61, 62, 63, and 64 are electrically separated and are receiving antennas, while exterior antenna 65 is a transmitting antenna. Because interior antennas 61, 62, 63, and 64 are electrically separate receiving antennas, the electro-magnetic coupling effect is reduced, and it is possible to discern distinct signals at each antenna. This is especially true since interior antennas 61, 62, 63, and 64 span a relatively large distance in comparison to the height of a tag over the floor where the antenna system is installed. A tag will be much closer to the one or two interior antennas above which it is located than to the other antennas in the system. This difference in distance will register as a stronger signal for the nearer antennas, allowing the tag to be associated with particular antennas and its position identified.

As discussed above with the pedestal embodiments, the various noise sources within an environment will be further away from the antenna system than a given tag detected by the system. Therefore, the noise profile will be much more similar at each interior antenna 61, 62, 63, and 64 than the tag signal profile. This allows the tag portion of the signals received by the array of interior antennas 61, 62, 63, and 64 to be distinguished from the portion due to ambient noise. This is especially true when the noise environment is pre-modeled before exterior antenna 65 generates an interrogation field pulse, and interior antennas 61, 62, 63, and 64 receive a signal from a tag.

Referring now back to FIG. 3, which is a block diagram of the processes applied to the signals received at each antenna in a system employing three receiving antennas, adding a fourth antenna will create three additional antenna pairs. This means that there will be three additional MAFs (first multi-function amplifier filter) to perform signal difference operations on the signals within each additional pair of antennas. Also, each of the second, third, and fourth antennas will have three additional digital potentiometers to adjust their noise signal amplitude of one or both antennas within a pair using feedback loops to the digital potentiometers associated with each antenna until the amplitude ratio within antenna pairs after filtering is optimized as close to 1:1 as possible. Additional receiving antennas would require additional multi-function amplifier filters and digital potentiometers in parallel to the number of additional antenna pairs created by adding receiving antennas.

Returning to FIG. 8, controller 70 can be located away from the antenna array for convenient access by users. Controller 70 contains the elements such as the digital potentiometers, multi-function amplifier filters, digital signal processor, input/output ports, etc. Off the shelf components may vary in the number of ports available to the user and this may influence the number of antennas used in a particular embodiment, or application. In addition to conditioning and analyzing the signals received from interior antennas 61, 62, 63, and 64, controller 70 drives exterior antenna 65 to generate the interrogation field. Controller 70 may also have interface elements so that the operation of the controller can be observed and adjusted. Although the typical system will make the measurements and adjustments automatically, some embodiments of the system may provide for manual adjustments through controller 70. Visual displays and manual controls would allow an operator to make the needed adjustments in stable noise environments. These displays and manual controls may be a normal part of the system or external devices capable of communicating with the system.

Figure 9:
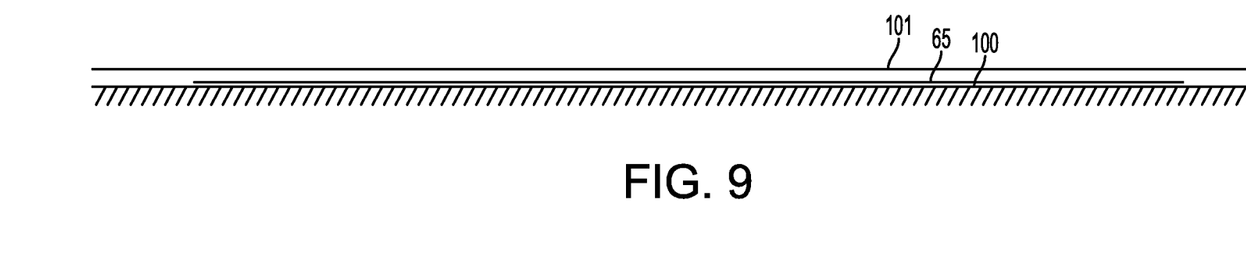
FIG. 9 is a side sectional view of an embodiment of the noise cancelling antenna system mounted in a floor.

FIG. 9 is a side sectional view of an embodiment of the noise cancelling antenna system mounted in a floor. Exterior antenna 65 is visible between sub-floor 100 and floor tiles 101. The placement of the antenna system within the floor of a location, keeps the antenna system out of the way and provides greater flexibility in the use of floor space at the location.

Although specific embodiments have been discussed, such as pedestal embodiments with three antennas, and floor embodiments with four interior receiving antennas and an external transmitting antenna, the invention is not limited to these specifically discussed embodiments. Some embodiments may use more or fewer antennas. Some embodiments may use different configurations of the antennas. Some embodiments may present a range of automated and manual operation. This can be done without removing these additional embodiments from the scope of this application.

I claim:

1. An electronic article surveillance system comprising:
   a plurality of n antennas, each said antenna not overlapping with any other antenna and not electrically connected to any other antenna, one of said antennas operating as a reference antenna and the other n−1 antennas operating as non-reference antennas;
   a controller, said controller comprising;
      a digital signal processor;
      at least one analog to digital converter;
      a plurality of n amplifier-filter circuits, each amplifier-filter circuit being dedicated to a given antenna;
      a plurality of multi-function amplifier filters, this plurality equal to the summation of integers from 1 through n−1, each said multi-function amplifier filter being dedicated to a given pair of said antennas; and
      a plurality of digital potentiometers, the plurality equal to 1 plus (n−1) squared, a set of n−1 of said digital potentiometers being dedicated to each of said non-reference antennas; wherein,
   the signal from each said antenna is directed through a respective amplifier filter circuit, the outputs of which are directed to said digital signal processor;
   the signal from said reference antenna is also passed through a single respective digital potentiometer, the output of which is directed to n−1 respective multi-function amplifier filters which pair said reference antenna with each said non-reference antenna;
   the signal from each said non-reference antenna is passed separately through n−1 digital potentiometers, the outputs of which are directed to n−1 multi-function amplifier filters through which each said non-reference antenna is paired with each other said antenna;
   each said multi-function amplifier filter performing a difference operation on the pair of signals it receives and directing the result to an analog to digital converter which in turn directs its output to said digital signal processor;
   said controller performing a surveillance cycle comprising;
      adjusting said digital potentiometers to minimize the output of each said multi-function amplifier filter,
      operating one of said n antennas to generate an interrogation field and then ceasing generating said field, and
      monitoring said antennas to determine if said antennas receive an additional signal.

2. The electronic article surveillance system of claim 1, wherein:
   if an additional signal is detected after said interrogation field is ceased, said controller compares the additional signal's strengths at said antennas to evaluate the proximity of the source of said additional signal to said antennas.

3. The electronic article surveillance system of claim 1, wherein:
   said antennas are coil antennas.

4. The electronic article surveillance system of claim 1, wherein:
   each said multi-function amplifier filter comprises a band pass filter for each signal it receives.

5. The electronic article surveillance system of claim 4, further comprising;
   at least one antenna pedestal, each said at least one antenna pedestal comprising a vertical antenna tower, said antenna tower housing said n antennas.

6. The electronic article surveillance system of claim 1, further comprising;
   a transmitting antenna, wherein
   said controller operates said transmitting antenna to generate said interrogation field rather than operating one of said n antennas to generate said interrogation field.

7. The electronic article surveillance system of claim 6, wherein;
   said transmitting antenna circumscribes said n antennas.

8. The electronic article surveillance system of claim 1, wherein;
   said multi-function amplifier filter comprises at least one tunable phase shifter for one of the signals it receives.

9. The electronic article surveillance system of claim 1, wherein;
   said antennas are located in the floor of the establishment where it is operating.

10. The electronic article surveillance system of claim 1, wherein;
    if an additional signal is detected after said interrogation field is ceased, said controller evaluates the amplitude and decay rate of the signal to determine if an electronic article surveillance tag is the source of the signal and what type of tag is the source.

11. The electronic article surveillance system of claim 1, further comprising:

a user interface, said user interface allowing a user to manually adjust said digital potentiometers to minimize the outputs of said multi-function amplifier filters.

12. The electronic article surveillance system of claim 1, further comprising:
an additional n−2 digital potentiometers, said n−2 digital potentiometers combining with said single potentiometer to provide n−1 digital potentiometers for said reference antenna, said reference antenna having a digital potentiometer between it and each multi-function amplifier filter receiving a signal from said reference antenna.

13. An electronic article surveillance system comprising:
a plurality of antennas, each said antenna not overlapping with any other antenna and not electrically connected to any other antenna, one of said antennas operating as a reference antenna and the other antennas operating as non-reference antennas, each said antenna forming a pair with each other antenna;
a controller;
a digital signal processor;
at least one analog to digital converter;
an amplifier-filter circuit for each antenna, each amplifier-filter circuit being dedicated to a given antenna, the signal from each said antenna being directed through a respective amplifier filter circuit, the outputs of which are directed to said digital signal processor;
a multi-function amplifier filter for each said pair of antennas, each multi-function amplifier filter receiving a signal from each antenna in its pair;
a single digital potentiometer dedicated to said reference antenna, the signal from said reference antenna also being passed through said single digital potentiometer, the output of which is directed to the respective multi-function amplifier filters which pair said reference antenna with each said non-reference antenna;
a digital potentiometer for each said non-reference antenna for each said pair, the signal from each said non-reference antenna being passed separately through a digital potentiometer for each said pair associated with a given antenna, the outputs of the digital potentiometers being directed to the respective multi-function amplifier filters through which each said non-reference antenna is paired with each other said antenna;
each said multi-function amplifier filter performing a difference operation on the pair of signals it receives and directing the result to an analog to digital converter which in turn directs its output to said digital signal processor;
said electronic article surveillance system performing a surveillance cycle comprising;
said digital signal processor adjusting said digital potentiometers to minimize the output of each said multi-function amplifier filter,
said controller operating one of said antennas to generate an interrogation field and then ceasing generating said interrogation field, and
said digital signal processor monitoring said antennas to determine if said antennas receive an additional signal.

14. The electronic article surveillance system of claim 13, wherein:
if an additional signal is detected after said interrogation field is ceased, said digital signal processor compares the additional signal's strengths at said antennas to evaluate the proximity of the source of said additional signal to said antennas.

15. The electronic article surveillance system of claim 13, wherein:
said antennas are coil antennas.

16. The electronic article surveillance system of claim 13, wherein:
each said multi-function amplifier filter comprises a band pass filter for each signal it receives.

17. The electronic article surveillance system of claim 13, further comprising;
at least one antenna pedestal, each said at least one antenna pedestal comprising a vertical antenna tower, said antenna tower housing said n antennas.

18. The electronic article surveillance system of claim 13, further comprising;
a transmitting antenna, said transmitting antenna circumscribing said antennas; wherein,
said controller operates said transmitting antenna to generate said interrogation field rather than operating one of said antennas to generate said interrogation field.

19. The electronic article surveillance system of claim 13, wherein;
said multi-function amplifier filter comprises at least one tunable phase shifter for one of the signals it receives.

20. The electronic article surveillance system of claim 13, wherein;
said antennas are located in the floor of the establishment where it is operating.

21. The electronic article surveillance system of claim 13, wherein;
if an additional signal is detected after said interrogation field is ceased, said digital signal processor evaluates the amplitude and decay rate of the signal to determine if an electronic article surveillance tag is the source of the signal and what type of tag is the source.

22. An electronic article surveillance system comprising:
a plurality of antennas, each said antenna not overlapping with any other antenna and not electrically connected to any other antenna, one of said antennas operating as a reference antenna and the other antennas operating as non-reference antennas, each said antenna forming a pair with each other antenna;
a controller;
a digital signal processor;
at least one analog to digital converter;
an amplifier-filter circuit for each said antenna, said digital signal processor receiving the output from each said amplifier-filter circuit, each said amplifier-filter circuit receiving the output from a single one of said antennas;
a multi-function amplifier filter for each said pair of antennas, each multi-function amplifier filter receiving a signal from each antenna in its pair, said signal from each antenna adjusted by a digital potentiometer, each said multi-function amplifier filter performing a difference operation on the pair of signals it receives and directing the resulting signal to an analog to digital converter, said digital signal processor receiving the analog to digital converted output from each said multi-function amplifier filter;
a single digital potentiometer dedicated to said reference antenna, the signal from said reference antenna being passed through said single digital potentiometer, each said multi-function amplifier filter that has said reference antenna as one of its pair receiving the output of said single digital amplifier;

a digital potentiometer for each said non-reference antenna for each said pair, the signal from each said non-reference antenna being passed separately through a digital potentiometer for each said pair with which a non-reference antenna is associated, the outputs of the digital potentiometers being directed to the respective multi-function amplifier filters through which each said non-reference antenna is paired with each other said antenna;

said electronic article surveillance system performing a surveillance cycle comprising;
- said digital signal processor adjusting said digital potentiometers to minimize the output of each said multi-function amplifier circuits,
- said controller operating one of said antennas to generate an interrogation field and then ceasing generating said interrogation field, and
- said digital signal processor monitoring said antennas to determine if said antennas receive an additional signal.

\* \* \* \* \*